Oct. 17, 1939.  T. R. RAYNER ET AL  2,176,720
ELECTRICAL SIGNALING SYSTEM
Filed July 5, 1935
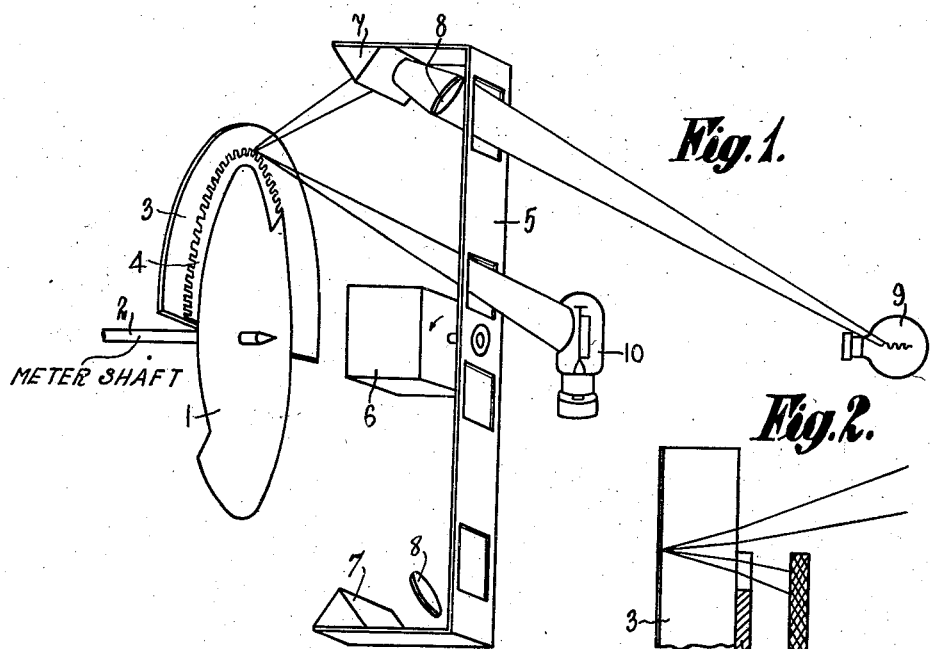
*Fig.1.*
*Fig.2.*
*Fig.3.*
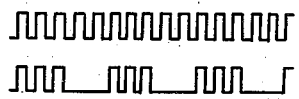
*Fig.4.*
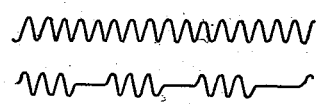
*Fig.5.*
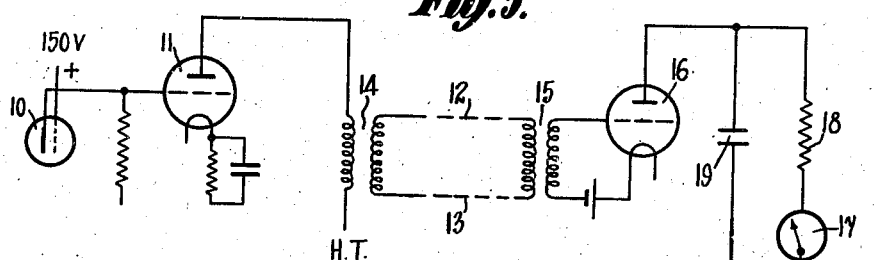
INVENTORS
THOMAS ROBERT RAYNER
GEORGE ARTHUR BURNS
HARRY STANLEY WOODHEAD
ATTY:

Patented Oct. 17, 1939

2,176,720

UNITED STATES PATENT OFFICE 2,176,720

ELECTRICAL SIGNALING SYSTEM

Thomas Robert Rayner, Wallasey, George Arthur Burns, Broadgreen, Liverpool, and Harry Stanley Woodhead, Woolton, Liverpool, England, assignors to Associated Telephone & Telegraph Company, Chicago, Ill., a corporation of Delaware Application July 5, 1935, Serial No. 29,790
In Great Britain July 27, 1934

2 Claims. (Cl. 177—351)

The present invention relates to electrical signaling systems and is more particularly concerned with systems suitable for the transmission of information such as meter readings whereby these may be indicated at a distant point. This facility is highly desirable in cases where electrical generating and transforming machinery or the like is located in a substation which is normally unattended and has its operation controlled from a distance.

Arrangements hitherto employed for transmitting meter readings or the like have generally been complicated and expensive especially if arranged to give continuous indications, and moreover have only been suitable for use in cases where special wires were provided since they could not make use of wires used for other purposes such as telephone wires which included repeaters.

An alternative arrangement is to make use of the so-called contact principle whereby at definite intervals the meter needle is clamped in position and engages a contact corresponding to its position, thereby permitting the transmission of characteristic impulses or currents to the distant recording equipment. This arrangement can hardly be satisfactory where the quantity to be measured is changing rapidly and the principle of constraining the meter needle clearly cannot be applied to give continuous readings.

According to one feature of the present invention an electrical signaling system for the distant transmission of information comprises a photo-electric cell, control means disposed in a circular path and adapted to be variably set in accordance with the information to be transmitted and optical means travelling in a related circular path to cause the photo-electric cell to be influenced in accordance with the manner in which the control means are set thereby causing characteristic electric currents to be generated to transmit the information.

According to another feature of the present invention an electrical signaling system for the distant transmission of meter readings or the like is arranged so that in accordance with the value of the required quantity, current flow takes place for a characteristic proportion of each of successive small intervals of time so that the mean current flowing as indicated for instance by a well-damped ammeter is a measure of the required quantity.

According to a further feature of the invention in an electrical signaling system for the distant transmission of information an optical record of the required information is scanned and made to influence a photo-electric cell the mean output of which represents a measure of the information required.

A still further feature of the invention is that in an electrical signaling system for the distant transmission of meter readings or the like a beam of light is arranged to rotate continuously over an arcuate mirror, a variable proportion of which is adapted to be obscured by a masking member positioned in accordance with the quantity to be measured, the light reflected from the mirror passing through a comb member and impinging on a photo-electric cell the alternating current output of which is transmitted over the signaling line and at the receiving end operates a well-damped ammeter in accordance with the mean current so as to give a reading corresponding to that of the meter at the transmitting end.

The invention will be better understood from the following description of one method of carrying it into effect which should be taken in conjunction with the accompanying drawing comprising Figures 1 to 5.

Fig. 1 gives a perspective view of the general arrangements at the transmitting end, Fig. 2 shows on an enlarged scale a detail of the mirror mounting, Fig. 3 represents the current in the photo-electric cell under three different conditions, while Fig. 4 represents the corresponding currents transmitted over the line, Fig. 5 shows diagrammatically the elements of the electrical circuits.

Considering now the mechanical arrangements as shown in Fig. 1, the vane designated 1 is mounted on the shaft 2 of a deflection meter preferably at the back so that the ordinary indications for observation on the spot are not interfered with. This vane is of the shape shown and is arranged according to its position to obscure more or less of the working area of a semi-circular mirror 3. Adjacent to this mirror is a semi-circular toothed member 4 in such position that it may be completely masked by the movable vane 1. A rotatable member 5, driven by an electric motor 6, carries at each end an optical system comprising a prism 7 and a lens 8. The stationary source of light 9 may be a gas-filled lamp which may be lighted by current somewhat lower than it is normally run, while 10 represents a stationary photo-electric cell. The arrangement is such that light from the lamp 9 passes through the rotating lens 8 and is internally reflected by the rotating prism 7 and impinges on the mirror 3. On reflection it passes between the teeth of the member 4 and unless the mask 1 is intercepting its passage impinges on the photo-electric cell 10. The optical system is arranged to produce a very narrow image of the filament of the lamp so that it may be absorbed by the back of one tooth of the member 4.

When the instrument is reading zero, the whole of the toothed member is masked and the rotating spot of light impinging on the mirror will therefore be reflected on to the back of the vane 1 as shown in Fig. 2 and cannot reach the photo-electric cell 10. With a full-scale reading of the meter on the other hand, the whole of the toothed member is exposed and intermittent flashes of light produced by the effect of the teeth impinge regularly on the photo-electric cell 10, the frequency depending on the number of teeth and on the speed of rotation of the member 5. If the vane 1 is in an intermediate position, each group of flashes of light will be succeeded by a dark period the relative lengths of the light and dark periods being dependent on the actual meter reading. These three conditions are represented diagrammatically in Figs. 3 and 4.

It will be appreciated that the number of arms on the rotating member 5 may be increased if desired, the maximum angular movement of the meter needle and its associated masking member being adjusted accordingly. Two is the minimum number which can be used however without sacrificing sensitivity or introducing difficulties in disposing of the masking member when it is not required to obscure the mirror.

Considering now the circuit arrangements as indicated in Fig. 5, the currents from the photo-electric cell 10 are suitably amplified by the valve 11 and fed to the line 12, 13 by way of the transformer 14. At the receiving end the impulses are extended to the input transformer 15 and are rectified by means of the valve 16 which may amplify if necessary or this function may be performed by a separate valve. The anode circuit of the valve 16 includes a well-damped ammeter 17 in series with a high resistance 18 and shunted by a condenser 19. The ammeter 17 reads the means value of the current flowing so that if continuous current flow over the line gives a full-scale ammeter deflection, the readings will correspond with those of the transmitting instrument. The reading of the receiving instrument is substantially independent of the amplitude of the current flowing over the line but is determined solely by the time ratio of the impulses; hence any changes in the constants of the line will be substantially without effect on the accuracy of the reading. A valve is preferably employed for rectification at the receiving end and it is arranged that the grid of the valve is swung heavily by an incoming signal thus making the impedance of the valve substantially constant for varying signal strengths. Furthermore the impedance of the valve is arranged to be small compared with the fixed resistance 18 included in the circuit. Care must also be taken to prevent variations in the voltage of the anode supply.

It will be appreciated that the transmission frequency depends on the number of teeth on the member 4 and also on the speed at which the member 5 is rotated. The frequency employed is preferably within the speech range and it will be appreciated that by the use of different frequencies with suitable filtering equipment a number of meter readings may be transmitted simultaneously over the same line, or alternatively meter readings may be transmitted at the same time as speech is proceeding.

It will be understood that the splitting of the light beam impinging on the photo-electric cell is not essential and the invention could in certain circumstances be operated with a flow of direct current over the line. The use of alternating current for signaling purposes has considerable advantages such as the ability to pass satisfactorily through telephone repeaters and the fact that the final reading is substantially independent of line conditions. The use of the toothed member as shown however performs the required function simply without the need for additional rotating parts. Moreover the arrangement shown is advantageous in that light which is cut off falls on the back of the masking member so that there is no danger of the photo-electric cell being influenced by reflection therefrom.

We claim:

1. In a system for the distant transmission of meter reading, a flat mirror, a rotating device for continuously directing a beam of light in a semi-circular arc over the surface of said mirror, a photo-electric cell in position to receive the light reflected from said mirror, a serrated mask over said mirror for causing said reflected light to strike said cell at a definite frequency during the rotation of said device, means for causing the beam of light to be reflected through said serrated mask for a proportionate time of each semi-circular rotation dependent upon the meter reading, means controlled by the photo-electric cell for producing alternating current at said frequency, and means for measuring the mean current flow produced by said last means to determine the meter reading.

2. In a telemetering system for the transmission of meter readings to a distant point comprising a flat semi-circular mirror, a source of light, a rotating device adapted to rotate a beam of light in a semi-circular arc over the surface of said mirror twice for each rotation of the device, a photo-electric cell in position to receive the reflected light from said mirror, an opaque slotted semi-circular disc adjacent said mirror in a position to interrupt the light reflected by said mirror each time an individual tooth in said slotted disc is passed by the reflected light beam, the number of said teeth and the speed of rotation of said rotating device being so arranged that the light beam interruptions take place at a definite voice frequency, a meter-controlled masking member for masking a portion of the light to be reflected through said semi-circular disc for a proportionate time of each semi-circular rotation dependent upon the meter reading, means controlled by the cell for producing alternating current at said definite frequency, and means for measuring the mean alternating current flow produced by said last means to determine the meter reading.

THOMAS ROBERT RAYNER.
GEORGE ARTHUR BURNS.
HARRY STANLEY WOODHEAD.